United States Patent
Higuchi

(10) Patent No.: US 8,092,066 B2
(45) Date of Patent: Jan. 10, 2012

(54) SURFACE LIGHT SOURCE DEVICE, LIGHTING DEVICE AND IMAGE DISPLAY DEVICE

(75) Inventor: Yasutaka Higuchi, Saitama (JP)

(73) Assignee: Enplas Corporation, Saitama (JP)

( * ) Notice: Subject to any disclaimer, the term of this patent is extended or adjusted under 35 U.S.C. 154(b) by 259 days.

(21) Appl. No.: 12/619,855

(22) Filed: Nov. 17, 2009

(65) Prior Publication Data
US 2010/0124077 A1    May 20, 2010

(30) Foreign Application Priority Data

Nov. 18, 2008  (JP) ................................. 2008-294037

(51) Int. Cl.
*F21V 7/04* (2006.01)
*F21V 8/00* (2006.01)
*G02B 6/43* (2006.01)

(52) U.S. Cl. ................. 362/616; 362/628; 385/901
(58) Field of Classification Search .......... 362/616, 362/628; 385/129, 901
See application file for complete search history.

(56) References Cited

U.S. PATENT DOCUMENTS

| 4,799,133 A * | 1/1989 | Strzalko et al. ............... 362/133 |
| 6,241,358 B1 * | 6/2001 | Higuchi et al. ............... 362/613 |
| 6,464,367 B2 * | 10/2002 | Ito et al. ...................... 362/613 |
| 6,580,477 B1 * | 6/2003 | Cho ............................... 349/65 |
| 7,080,933 B2 * | 7/2006 | Chen et al. ................... 362/616 |
| 7,175,332 B2 * | 2/2007 | Tang ............................. 362/616 |
| 7,413,330 B2 * | 8/2008 | Furukawa ..................... 362/600 |
| 7,490,963 B2 * | 2/2009 | Fang et al. ................... 362/330 |
| 7,967,462 B2 * | 6/2011 | Ogiro et al. ................. 362/97.2 |
| 2006/0245213 A1 * | 11/2006 | Beil et al. .................... 362/616 |

FOREIGN PATENT DOCUMENTS

JP    2008-108622 A    5/2008

* cited by examiner

*Primary Examiner* — Alan Cariaso
(74) *Attorney, Agent, or Firm* — Kubotera & Associates, LLC

(57) ABSTRACT

A surface light source device improves the quality of illumination without producing dark lines between neighboring light guide plates even when a plurality of light guide plates are used in combination. This surface light source device is formed by combining a plurality of LED/light guide plate units, and light guide plate (4) has: light emitting area (8) of a square shape from a plan view; extended area (10) which is positioned extending outward from a pair of neighboring sides (8a) and (8b) in four sides (8a) to (8d) defining the outer rim of this light emitting area (8); and incidence surface area (11) on which light from LED (6) is incident. Each light guide plate (4) has a symmetrical shape with respect to one of the diagonal lines of light emitting area (8), and is combined by making its orientation uniform in the same direction. At this time, sides (8c) and (8d) in which the extended area of light emitting area (8) of one light guide plate (4) are aligned with sides (8a) and (8b) in which extended areas (10) of other neighboring light guide plates (4) are formed, and extended areas (10) of other light guide plates (4) are placed in the back surface side of light emitting area (8) of one light guide plate (4).

4 Claims, 11 Drawing Sheets

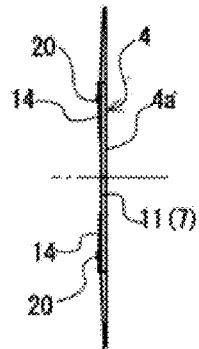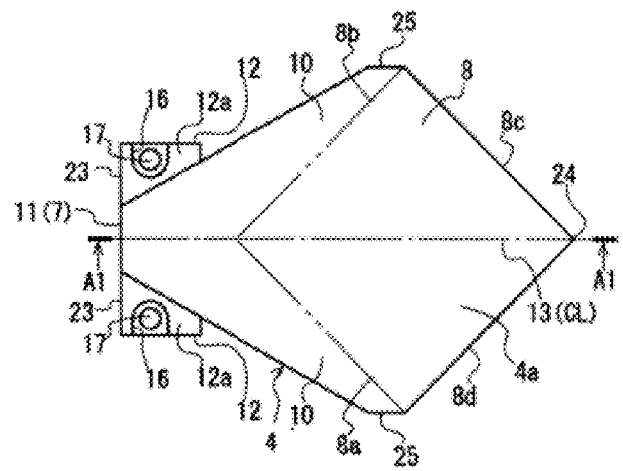
FIG.4E  FIG.4A
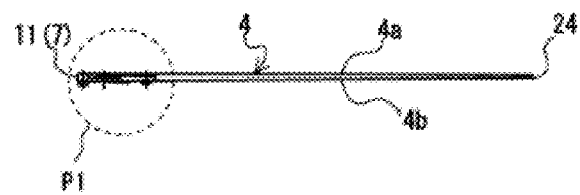
FIG.4B
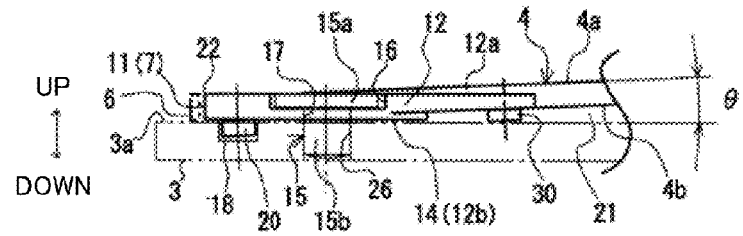
FIG.4C
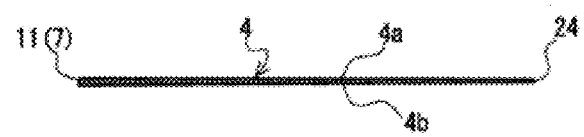
FIG.4D

SURFACE LIGHT SOURCE DEVICE, LIGHTING DEVICE AND IMAGE DISPLAY DEVICE

CROSS REFERENCE TO RELATED APPLICATIONS

The disclosure of Japanese Patent Application No. 2008-294037, filed on Nov. 18, 2008, including the specification, drawings and abstract, is incorporated herein by reference in its entirety.

TECHNICAL FIELD

The present invention relates to a surface light source device that combines a plurality of light guide plates into one panel to emit light from the surface of this panel, a lighting device that uses this surface light device, and an image display device that uses this lighting device. Here, "lighting device" includes, for example, devices used to backlight a liquid crystal display panel, advertisement panel and guide plate, or illuminate, for example, a room, and also includes a wide range of devices that emit illuminating light using the above light source device. Further, with the image display device, an object-to-be-illuminated (for example, a liquid crystal display panel, advertisement panel and guide plate) is backlighted by the above lighting device.

BACKGROUND ART

Conventionally, an image display device that forms a liquid crystal television and so on uses a surface light source device as a backlight device to backlight the liquid crystal display panel. Further, Patent Literature 1 has heretofore proposed a surface light source device that improves the contrast on the display screen of the image display device and turns off part of light depending on the state of image display on the display screen to reduce power consumption, and that is made thinner.

FIG. 1 shows one such surface light source device 100. Surface light source device 100 shown in this FIG. 1 is formed by combining in a matrix shape a plurality of light guide plates 103 on which light from LEDs (i.e. light emitting element) 101 is incident from side end surface 102, and is designed to turn on and off instantaneously each light guide plate 103 by turning on and off LED 101 provided to each light guide plate 103 and turn on and off illuminating light on a per light guide plate 103 basis.

CITATION LIST

Patent Literature

Patent Literature 1: Japanese Patent Application Laid-Open No. 2008-108622

SUMMARY OF INVENTION

Technical Problem

In surface light source device 100 shown in FIG. 1, projecting piece 105 is formed in side end surface (i.e. front end surface) 104 positioned on the opposite side of side end surface (i.e. the plane on which light from LED 101 is incident) 102 of the incident plane of light guide plate 103, such that projecting piece 105 covers the light emitting surface side of LED 101 provided in another neighboring light guide plate 103, and, on the light emitting surface side of this projecting piece 105, diffusion plate 106 of a light diffusion means is fixed and attached or fine irregularities of a light diffusion means are formed.

However, although surface light source device 100 shown in this FIG. 1 can prevent production of dark lines caused by the parts in which light guide plates 103 that are adjacent in the longitudinal direction face each other, any countermeasure is not applied to the parts in which light guide plates 103 that are adjacent in the horizontal direction face each other. Therefore, there is a problem that dark lines are produced in these facing parts 107 in which these light guide plates 103 that are adjacent in the horizontal direction face each other and the quality of illumination deteriorates due to production of dark lines.

It is therefore an object of the present invention to provide a surface light source device that can improve the quality of illumination without producing dark lines between neighboring light guide plates even when a plurality of light guide plates are used in combination, a lighting device equipped with this surface light source device and an image display device equipped with this lighting device. Further, it is also an object of the present invention to provide a surface light device of high light use efficiency utilizing the light emission characteristics of light emitting elements, a lighting device equipped with this surface light source and an image display device equipped with this lighting device.

Solution to Problem

To achieve the above object, the surface light source device according to the present invention that combines a light emitting element and a light guide plate to form a light emitting element/light guide plate unit, and that combines a plurality of light emitting element/light guide plate units to emit planar light of a rectangular shape, employs a configuration in which: the light guide plate has: a light emitting area that has a square shape from a plan view and that has a surface of an emission surface and a back surface provided on an opposite side of the surface; an extended area that is positioned extending outward from a pair of neighboring sides in four sides defining an outer rim of the light emitting area; and an incidence surface area that allows light from the light emitting element to enter an end part lateral surface of the extended area; the extended area and the incidence surface area have symmetrical shapes with respect to one of diagonal lines of the light emitting area and an extending line of the one diagonal line; one of the plurality of light emitting element/light guide plate units is combined with another light emitting element/light guide plate unit by: assuming that the light guide plate of the one light emitting element/light guide plate unit is a first light guide plate and the light guide plate of the other light emitting element/light guide plate unit is a second light guide plate; making orientations of the first light guide plate and the second light guide plate uniform; aligning a side, which is one of the four sides defining an outer rim of the light emitting area of the second light guide plate and in which the extended area is formed, with a side which is one of four sides defining an outer rim of the light emitting area of the first light guide plate and in which the extended area is not formed; placing the extended area of the second light guide plate in a back surface side of the light emitting area of the first light guide plate; and positioning the side in which the extended area of the first light guide plate is not formed, on the second light guide plate; and a reflective sheet is arranged on a substantially entire area of at least the back surface side of the light emitting area of the first light guide plate, and, in a position where the first light guide plate and the second light guide plate overlap, is arranged between a back surface side of the first light guide plate and a surface side of the second light guide plate.

Advantageous Effects of Invention

The present invention can improve the quality of illumination without producing dark lines between neighboring light guide plates even when a plurality of light guide plates are used in combination.

BRIEF DESCRIPTION OF DRAWINGS

FIGS. 4A to 4E shows a light guide plate forming the surface light source device of FIG. 2;

FIG. 4A is a plan view of a light guide plate;

FIG. 4B is a side view of a light guide plate;

FIG. 4C is a view magnifying an end part lateral surface side (i.e. the area indicated by P1 in FIG. 4B) of the light guide plate of FIG. 4B;

FIG. 4D is a cross-sectional view showing a cross-section through line A1-A1 of FIG. 4A;

FIG. 4E is a front view of a light guide plate;

DESCRIPTION OF EMBODIMENTS

Embodiments of the present invention will be explained in detail below with reference to the accompanying drawings.

Embodiment 1

Figure 1:
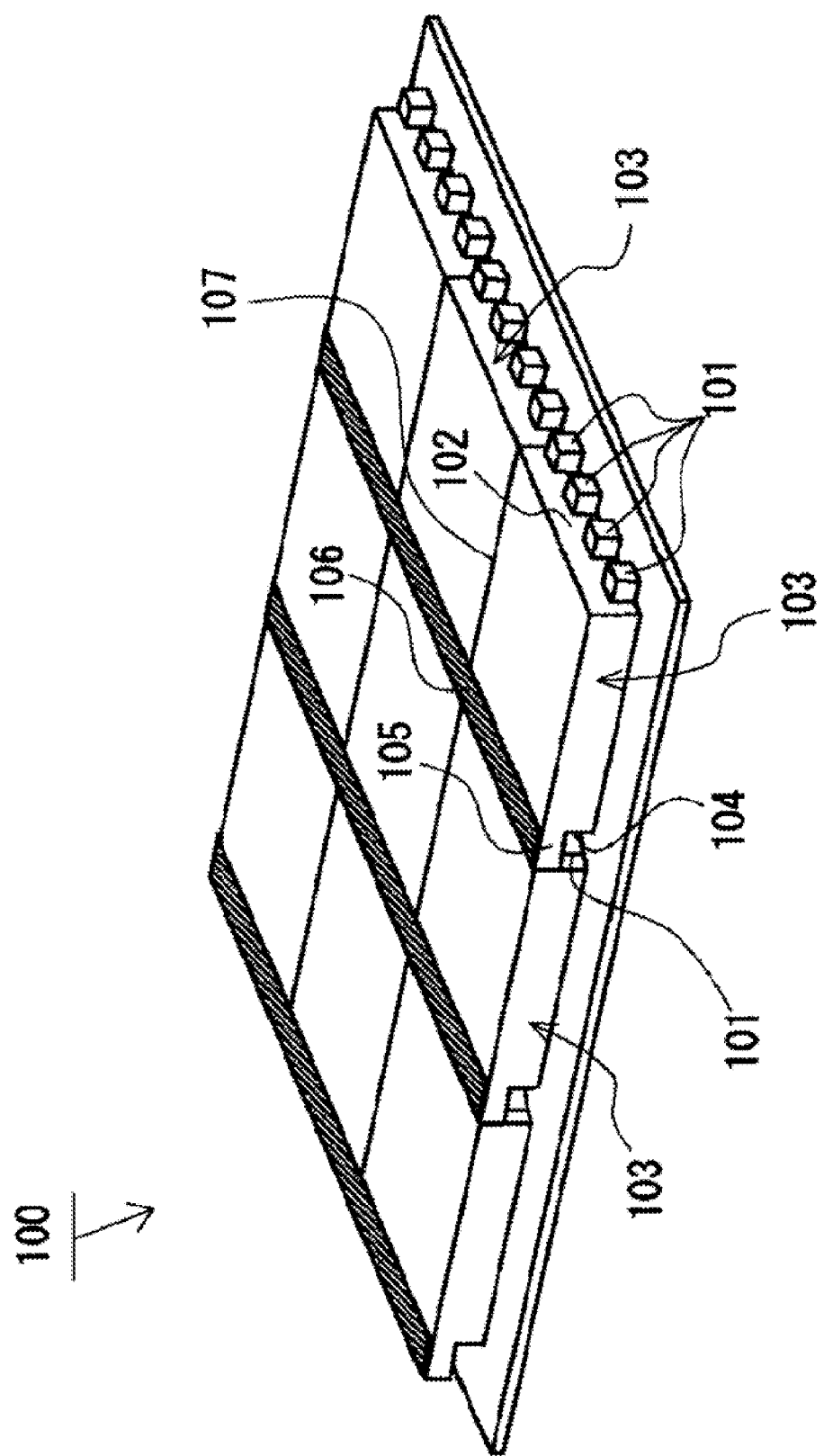
FIG. 1 is a perspective view of an outlook of a conventional surface light source device.
Figure 2:
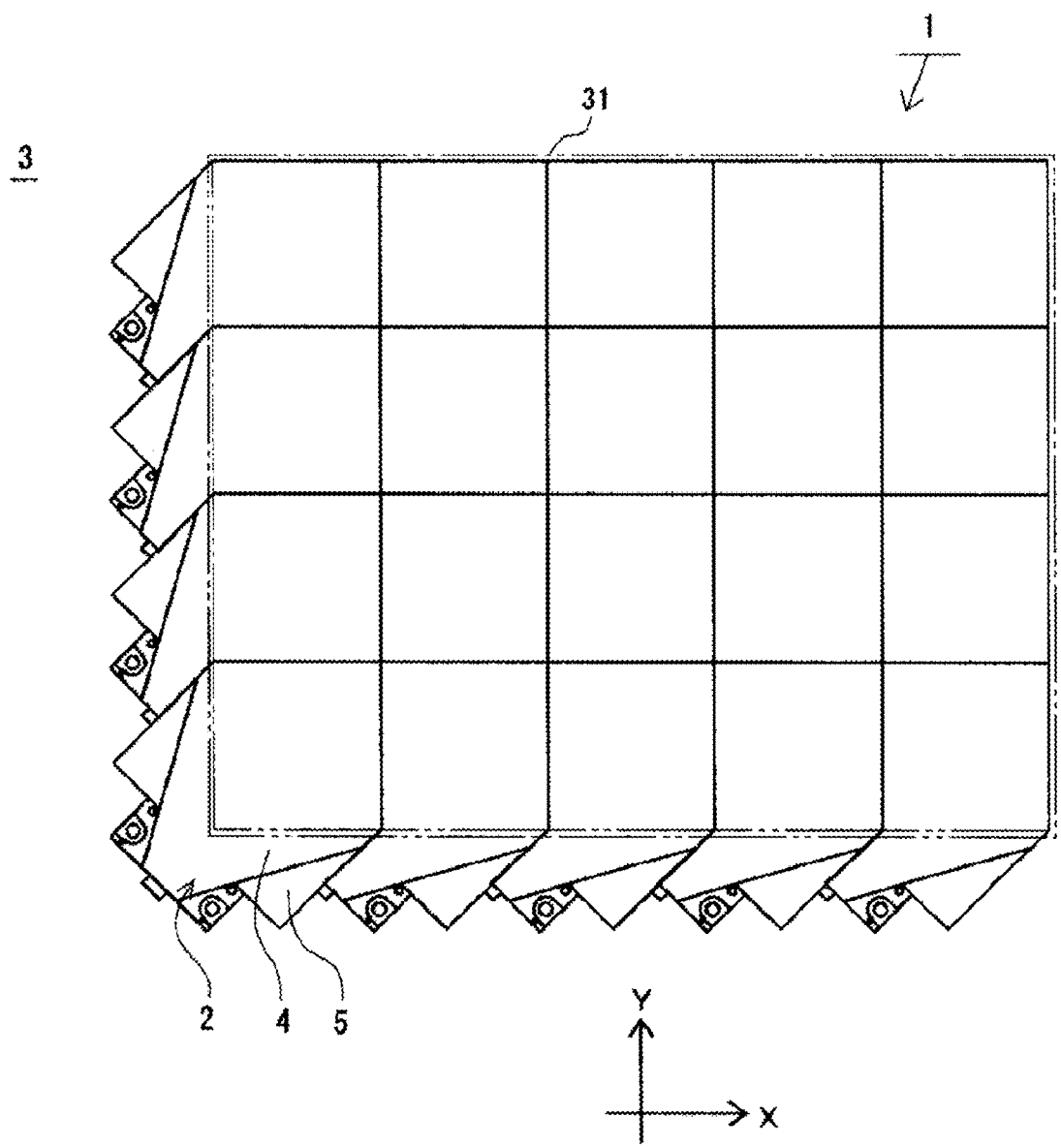
FIG. 2 is a plan view of the light source device according to Embodiment 1 of the present invention.

FIG. 2 is a plan view of surface light source device 1 according to an embodiment of the present invention. As shown in this FIG. 2, surface light source device 1 according to the present embodiment is formed by arranging a column of four LED (light emitting element)/light guide plate units 2 in the Y direction and arranging five of these columns of four LED/light guide plate units 2 in the X direction, and therefore a total of twenty LED/light guide plate units 2 are attached on substrate 3 in a matrix shape. Further, with surface light source device 1 shown in this FIG. 2, reflective sheet 5 that reflects light emitted from the back surface of light guide plate 4 back to the inside of light guide plate 4, is arranged on the back surface side of each light guide plate 4 forming LED/light guide plate unit 2. Furthermore, it is possible to form a lighting device by arranging a light control member such as a diffusion sheet or prism sheet on the light emitting surface side of surface light source device 1 of this FIG. 2, and form an image display device by further combining the lighting device with, for example, a liquid crystal panel, advertisement plate or guide plate illuminated by the lighting device.

Figure 3:
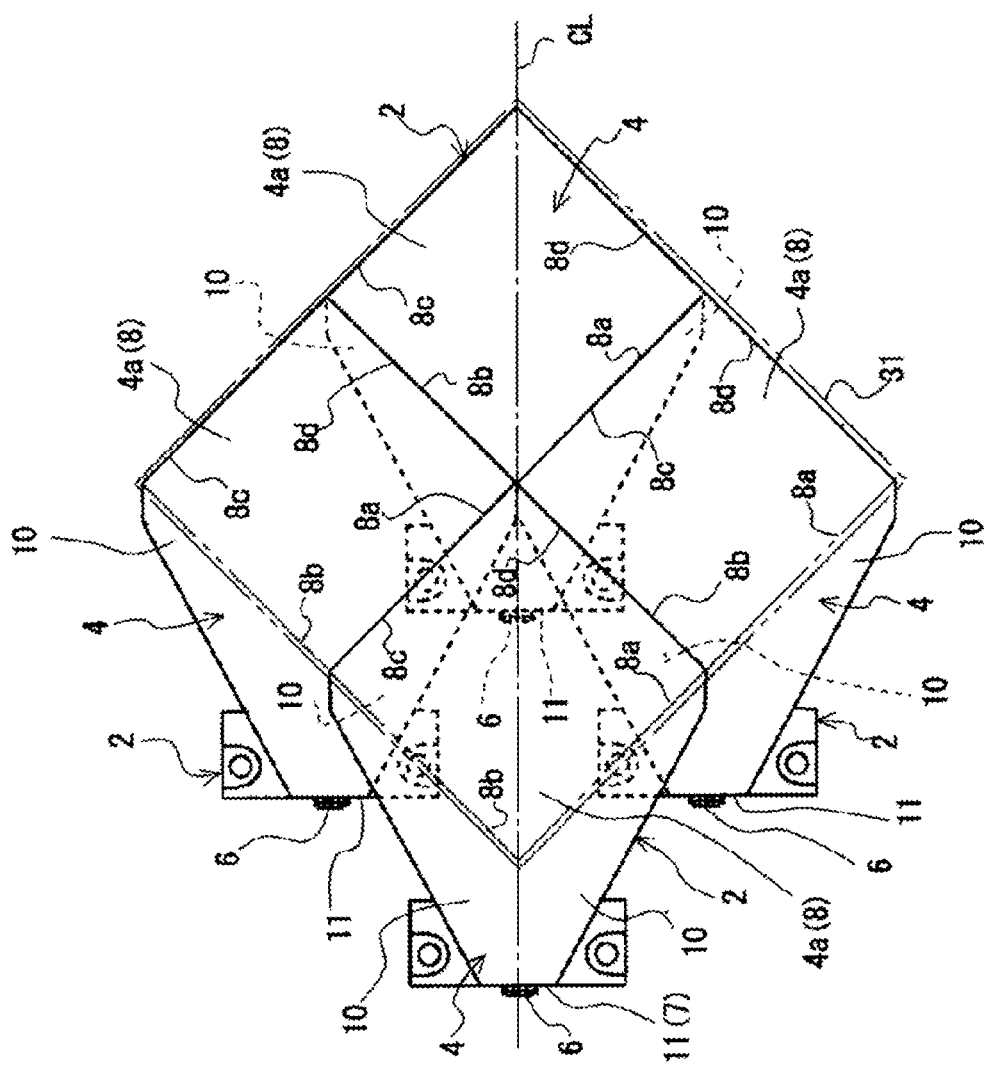
FIG. 3 is a plan view showing four neighboring LED/light guide plate units picked out of the surface light source device of FIG. 2.

FIG. 3 is a plan view showing four neighboring LED/light guide plate units 2 picked out of surface light source device 1 of FIG. 2. As shown in this FIG. 3, LED/light guide plate unit 2 refers to a light emitting unit combining LED (white LED) 6 of a light emitting element and flat light guide plate 4, and allows light from LED 6 to enter end part lateral surface 7 of light guide plate 4 and emits light that has entered this light guide plate 4, as planar light from the side of surface 4a of light guide plate 4. Here, LED 6 faces end part lateral surface 7 of light guide plate 4 arranged on substrate 3, and the same number of LEDs 6 as the number of light guide plates 4 (i.e. four LEDs in FIG. 3 and twenty LEDs in FIG. 2) are fixed on substrate 3 in a matrix shape such that light fluxes efficiently enter light guide plates 4 from end part lateral surfaces 7 of light guide plates 4. Further, four light guide plates 4 are arranged in a uniform orientation such that all of their end part lateral surfaces 7 are positioned facing the same direction.

Figure 5:
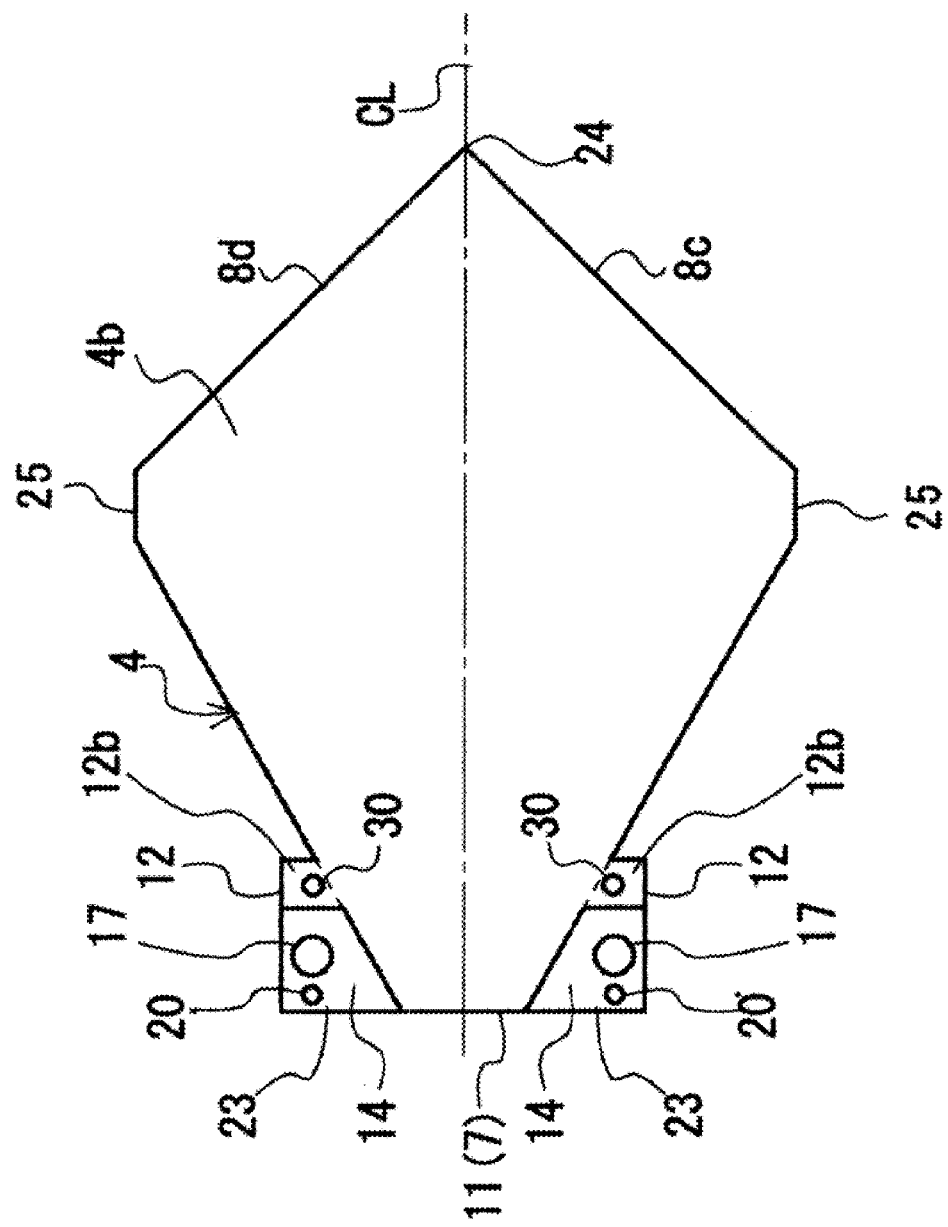
FIG. 5 is a back view of the light guide plate of FIGS. 4A to 4E.

FIGS. 4A to 4E and FIG. 5 show light guide plate 4. FIG. 4A is a plan view of light guide plate 4, FIG. 4B is a side view of light guide plate 4, FIG. 4C is a view magnifying the end part lateral surface 7 side (i.e. the portion indicated by P1 of FIG. 4B) of light guide plate 4 of FIG. 4B, FIG. 4D is a cross-sectional view showing a cross-section through line A1-A1 of FIG. 4A, and FIG. 4E is a front view of light guide plate 4. Further, FIG. 5 is a back view of light guide plate 4.

As shown in FIG. 4A, light guide plate 4 has: light emitting area 8 of a square shape from a plan view; extended area 10 positioned extending outward from a pair of neighboring sides 8a and 8b in four sides 8a to 8d defining the outer rim of this light emitting area 8; incidence surface area 11 that is formed at the front end part of this extended area 10; and attaching flange parts 12 that each extend outward from the front end side of extended area 10. Further, this light guide plate 4 is formed in a symmetrical shape with respect to the center line CL formed by one diagonal line 13 of square light emitting area 8 and the extending line of this diagonal line 13, and light emitting area 8, extended area 10, incidence surface area 11 and attaching flange parts 12 are formed symmetrically with respect to the center line CL. Here, with the present embodiment, incidence surface area 11 refers to end part lateral surface 7 of extended area 10 of light guide plate 4 on the LED 6 side. However, in case where an incident light control part such as a rough surface part or prism surface is formed in the part of light guide plate 4 facing LED 6, incidence surface area 11 refers to an incident light control part and the rest of end part lateral surface 7 of extended area 11 on the LED 6 side.

Further, as shown in FIGS. 4B and 4C and FIG. 5, in light guide plate 4, base planes 14 that are mounted on upper surface 3a of substrate 3 are formed on the back surface 12b side of attaching flange parts 12, counterbore holes 16 that accommodate head parts 15a of fixing screws 15 are formed on the surface 12a side of attaching flange parts 12, and screw holes 17 for inserting axial parts 15b of fixing screws 15 through these counterbore holes 16 are formed to penetrate base planes 14. Further, the depth of the hole of this counterbore hole 16 is dimensioned such that head part 15a of fixing screw 15 does not project from surface 12a of attaching flange part 12.

Further, as shown in FIGS. 4A to 4E and FIG. 5, in light guide plate 4, on the back surface 12b side of attaching flange part 12, a pair of positioning projections 20 that engage with a pair of positioning holes 18 formed on substrate 3 are formed to project in symmetrical positions with respect to the center line CL. Further, attaching flange part 12 of this light guide plate 4 is formed such that surface 12a and base plane 14 become parallel and is formed at a predetermined angle θ with respect to extended area 10 and the surface of light emitting area 8 (i.e. surface 4a of light guide plate 4 except for attaching flange part 12, hereinafter "surface 4a"). That is, as shown in FIGS. 4A to 4C and 4E, surface 4a and back surface 4b of extended area 10 and light emitting area 8 of light guide plate 4 form virtually identical planes. Further, surface 4a of both areas (10 and 8) is formed to incline above the virtual plane by rotating upper surface 3a of substrate 3 at a predetermined angle θ (at 1.9 degrees with the present embodiment) in the counter-clockwise direction (the counter-clockwise direction in FIG. 4C) with respect to upper surface 3a of substrate 3. Further, gap 21 is produced between back surface 4b of both areas (10 and 8) and upper surface 3a of substrate 3. Further, upper end rim 22 of incidence surface area 11 of light guide plate 4 is formed such that upper end rim 22 is as high as the upper end rim of lateral surface 23 (that is, the same height from upper surface 3a of substrate 3) of attaching flange part 12 positioned on the LED 6 side. Then, light guide plate 4 is formed such that lateral surface 23 of attaching flange part 12 on the LED 6 side is positioned on the extension from incidence surface area 11.

Further, as shown in FIGS. 4B and 4D, the thickness of light guide plate 4 decreases gradually away from incidence surface area 11 is spaced apart more, such that light from LED 6 entering light guide plate 4 from incidence surface area 11 is more easily emitted from light emitting area 8 of light guide plate 4 on the surface 4a side. Here, the incidence surface area 11 side of light guide plate 4 will be referred to as the "front end," and the end part 24 side of light guide plate 4, positioned on the opposite side of incidence surface area 11 of light guide plate 4 will be referred to as the "rear end."

Further, as shown in FIG. 3 and FIGS. 4A to 4E, in light guide plate 4, one of two sides 8c and 8d of light emission area 8 on the rear end (24) side overlaps one of two sides 8a and 8b of light emitting area 8 of another neighboring light guide plate 4 on the front end (11) side, and extended area 10 of another neighboring light guide plate 4 is placed in gap 21 and overlaps back surface 4b and substrate 3. In this way, even if surface light source device 1 is formed by combining a plurality of LED/light guide plate units 2, no gap is produced between light emitting areas 8 of neighboring light guide plates 4 when surface light source device 1 is seen from the light emitting surface (i.e. emission surface) side.

Here, in FIG. 3, assume, for ease of explanation, that light guide plate 4 in the first column from the left is first light guide plate 4, upper light guide plate 4 in the second column from the left is second light guide plate 4, lower light guide plate 4 in the second column from the left is third light guide plate 4 and light guide plate 4 in the third column from the left is fourth light guide plate 4. In order to prevent extended area 10 of second light guide plate 4 from overlapping extended area 10 of third light guide plate 4 in the back surface side of first light guide plate 4, the dimension in the width direction (i.e. the dimension in the direction orthogonal to the center line CL of light guide plate 4) of extended area 10 of light guide plate 4 is limited to the same dimension of the diagonal line of light emitting area 8 of light guide plate 4, and width direction end surfaces 25 extending along the center line CL of light guide plate 4 are formed in extended area 10 of light guide plate 4 (see FIG. 4A). Further, fourth light guide plate 4 is arranged such that the center line CL of fourth light guide plate 4 overlaps the extension of the center line CL of first light guide plate 4, one (8a) of two sides 8a and 8b of light emitting area 8 on the front end side overlaps one (8c) of two sides 8c and 8d of second light guide plate 4 on the rear end side, the other one (8b) of two sides 8a and 8b of light emitting area 8 on the front end side overlaps the other one (8d) of two sides 8c and 8d of third light guide plate 4 on the rear end side, and extended area 10 is placed in gap 21 between substrate 3 and the back surface 4b sides of first to third light guide plates 4 (see FIGS. 8A and 8B).

The assembled state of surface light source device 1 will be explained based on FIG. 3 and FIGS. 4A to 4E. First, by inserting positioning projections 20 of fourth light guide plate 4 in positioning holes 18 for fourth light guide plate 4 formed in substrate 3, incidence surface area 11 of fourth light guide plate 4 is positioned in relation to LED 6 and screw holes 17 of fourth light guide plate 4 are positioned in screw holes 26 of substrate 3 (see FIG. 4C). In this state, fixing screws 15 are inserted in screw holes 17 of fourth light guide plate 4, and, using these fixing screws 15, fourth light guide plate 4 is fastened and fixed to substrate 3. Next, by inserting positioning projections 20 of third light guide plate 4 in positioning holes 18 for third light guide plate 4 formed in substrate 3, incidence surface area 11 of third light guide plate 4 is positioned in relation to LED 6, and screw holes 17 of third light guide plate 4 are positioned in screw holes 26 of substrate 3 and light emitting area 8 of third light guide plate 4 is placed over extended area 10 of fourth light guide plate 4. In this state, fixing screws 15 are inserted in screw holes 17 of third light guide plate 4, and, using these fixing screws 15, third light guide plate 4 is fastened and fixed to substrate 3. Similarly, by inserting positioning projections 20 of second light guide plate 4 in positioning holes 18 for second light guide plate 4 formed in substrate 3, incidence surface area 11 of second light guide plate 4 is positioned in relation to LED 6, and screw holes 17 of second light guide plate 4 are positioned in screw holes 26 of substrate 3 and light emitting area 8 of second light guide plate 4 is placed over extended area 10 of fourth light guide plate 4. In this state, fixing screws 15 are inserted in screw holes 17 of second light guide plate 4, and, using these fixing screws 15, second light guide plate 4 is fastened and fixed to substrate 3. Next, by inserting positioning projections 20 of first light guide plate 4 in positioning holes 18 for first light guide plate 4 formed in substrate 3, incidence surface area 11 of first light guide plate 4 is positioned in relation to LED 6, and screw holes 17 of first light guide plate 4 are positioned in screw holes 26 of substrate 3 and light emitting area 8 of first light guide plate 4 is placed over extended areas 10 of second light guide plate 4 and third light guide plate 4. In this state, fixing screws 15 are inserted in screw holes 17 of first light guide plate 4, and, using these fixing screws 15, first light guide plate 4 is fastened and fixed to substrate 3. By this means, as shown in FIG. 3, four LED/light guide plate units 2 are assembled in substrate 3. Further, when surface light source device 1 of FIG. 2 is assembled in substrate 3, light guide plate (i.e. the twentieth light guide plate) 4 in the fourth row from the bottom of the fifth column positioned farthest from first light guide plate 4 is first assembled to substrate 3.

Figure 6:
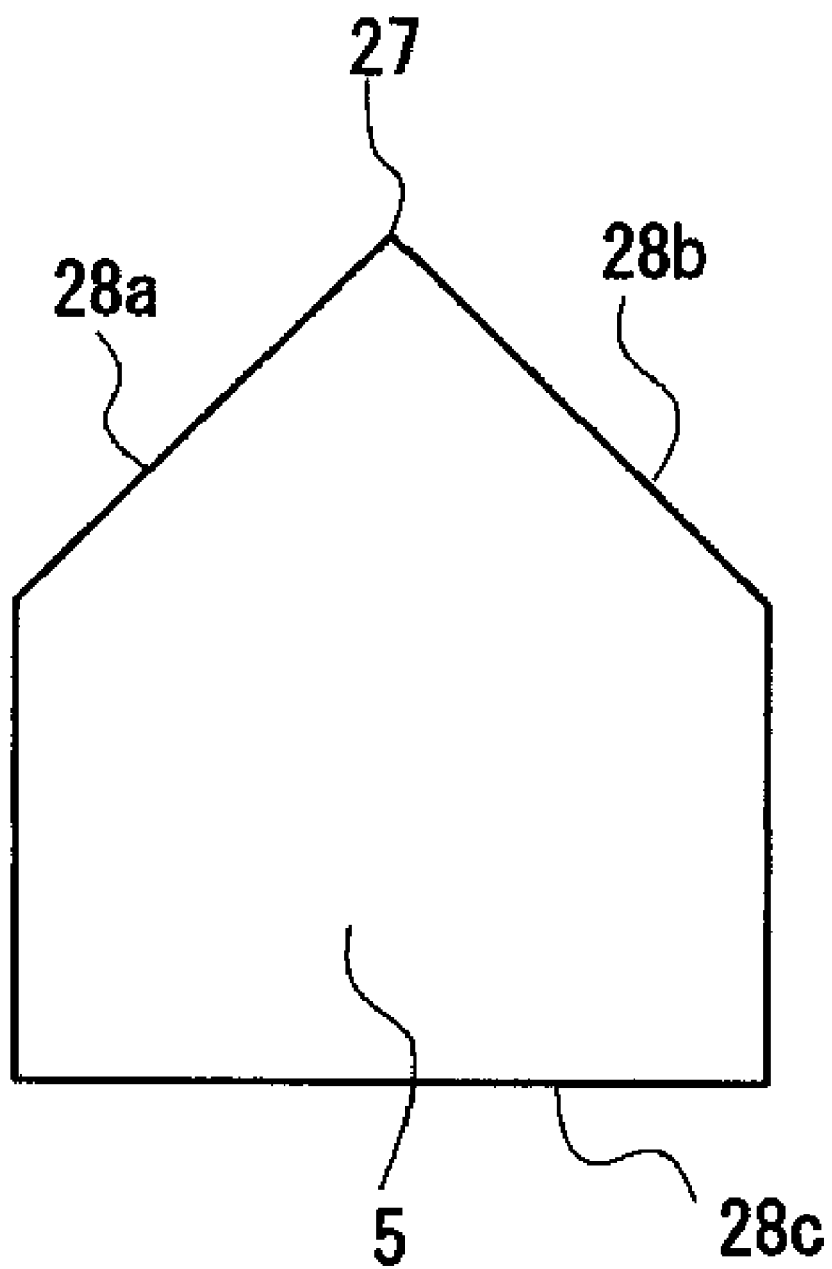
FIG. 6 is a plan view of a reflective sheet.
Figure 7:
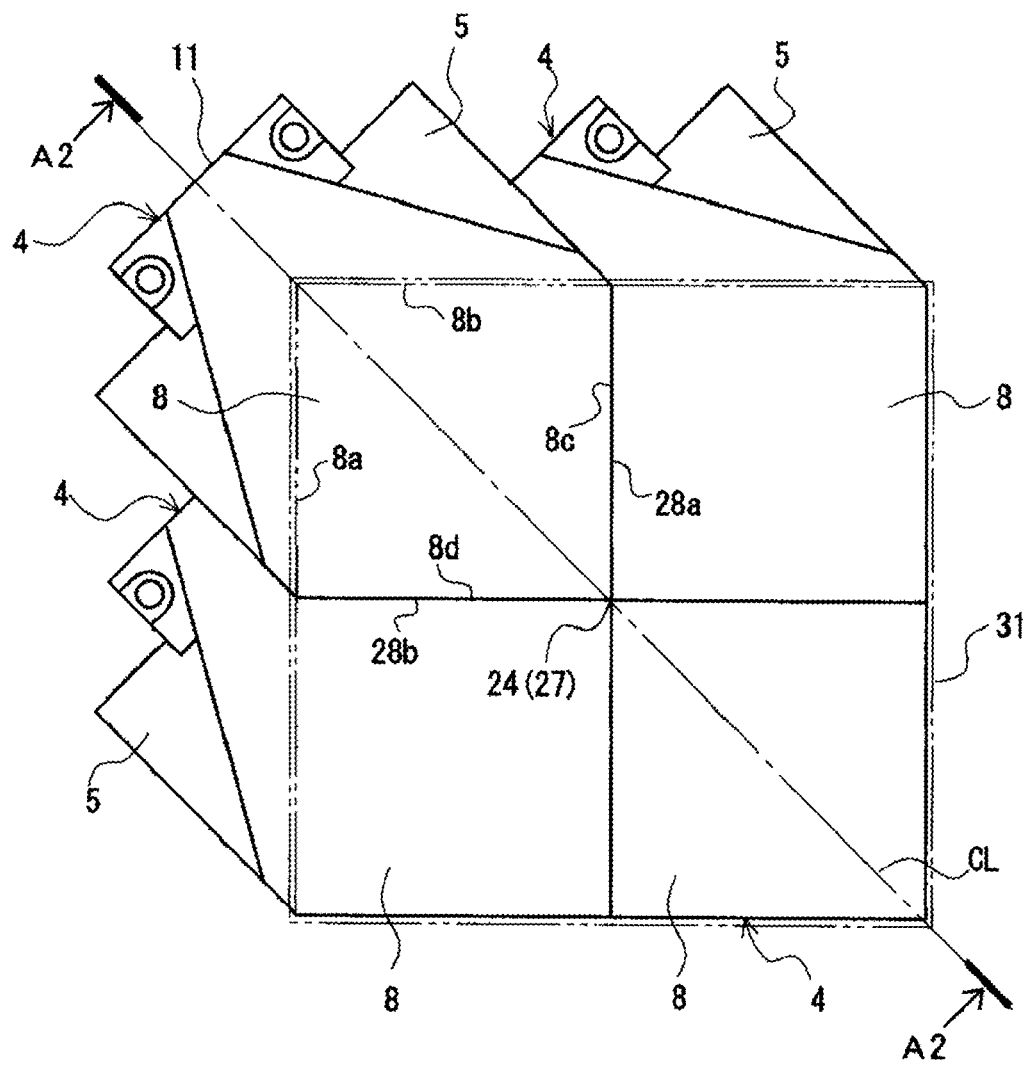
FIG. 7 is a plan view showing the state in which the reflective sheets of FIG. 6 are assembled in the four LED/light guide plate units of FIG. 3.
Figure 8A:
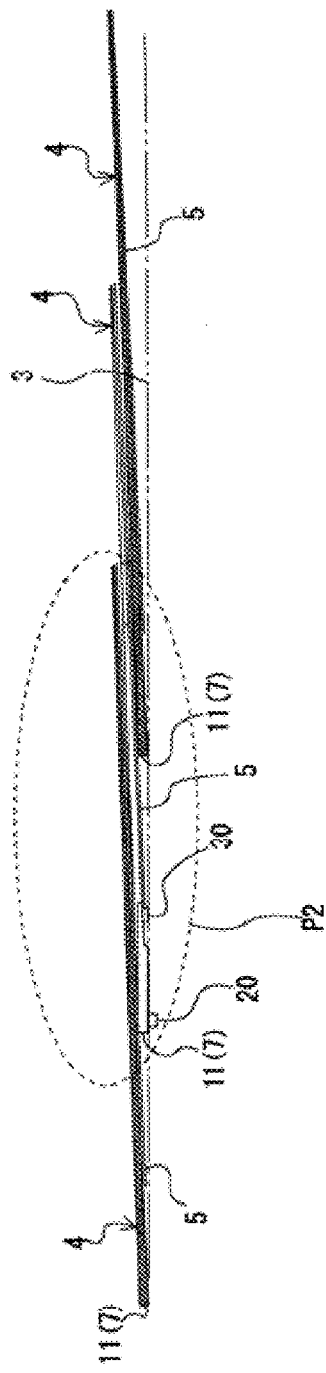
FIG. 8A is a cross-sectional view showing a cross-section through line A2-A2 of FIG. 7.
Figure 8B:
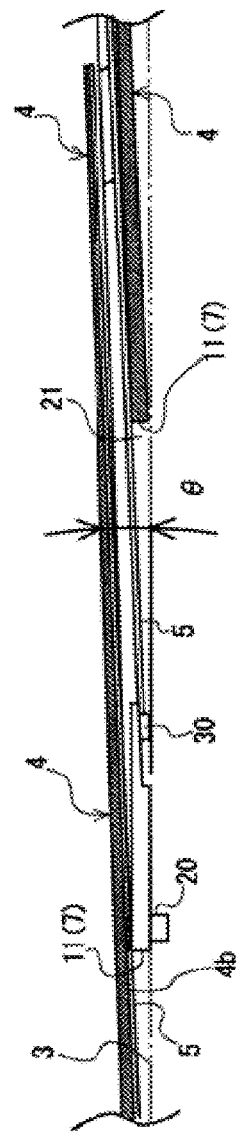
FIG. 8B is a cross-sectional view magnifying the area indicated by P2 of FIG. 8A.

Then, reflective sheet 5 has a shape in which both side parts of the rectangular equilateral triangle are equally cut off, from a plan view as shown in FIG. 6, and aligns apex 27 of its triangle with rear end 24 of light guide plate 4 and aligns two sides 28a and 28b joining apex 27 of this triangle, with two sides 8c and 8d of light emitting area 8 of light guide plate 4 on the rear end 24 side, such that reflective sheet 5 is inserted between the back surface 4b side of light guide plate 4 and other light guide plates 4 (see FIGS. 8A and 8B). As a result, as shown in FIG. 7, the overlapping portions between first to fourth light guide plates 4 are covered by reflective sheets 5, and are not seen from the emission surface side. In this way, surface light source device 1 shown in FIG. 2 is formed by combining a total of twenty LED/light guide plate units 2 and a total of twenty reflective sheets 5 in the X and Y directions. Further, although, with the present embodiment, positioning is performed by making one side 28c corresponding to the base of reflective sheet 5 abut on sheet abutting projection 30 that is formed on the back surface side of attaching flange part 12, the present invention is not limited to this, and it is equally possible to provide no sheet abutting projection 30 and adequately adjust the positions of reflective sheet 5 and light guide plate 4.

Figure 9:
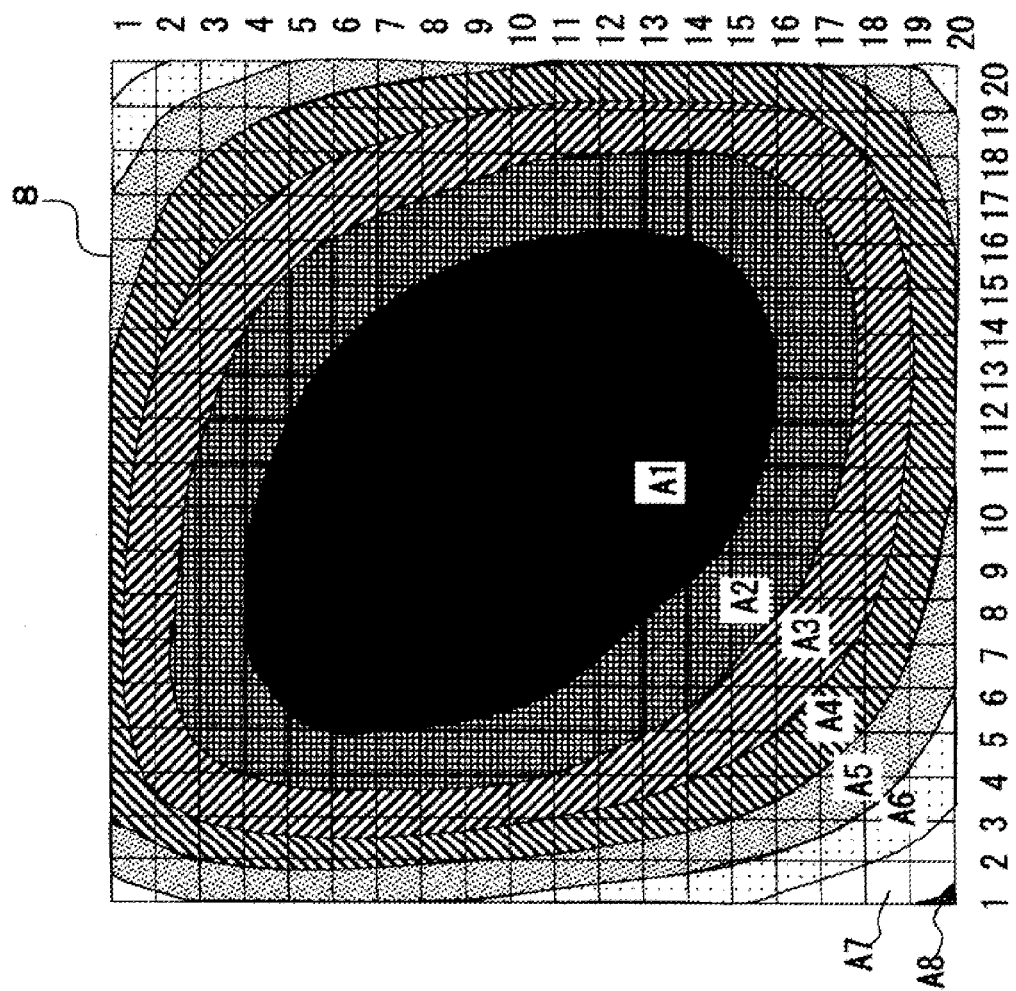
FIG. 9 shows a luminance distribution of light emitted from a light emitting area of a single LED/light guide plate unit.

FIG. 9 shows the luminance of light emitted from light emitting area 8 of one LED/light guide plate unit 2 where light emitting area 8 are divided into a total of 400 areas of 20 areas in the X direction and 20 areas in the Y direction and the luminance of light emitted from the center of 400 divided areas is measured such that measurement results associated with the surface of light emitting area 8 are shown. In this FIG. 9, assuming that the highest numerical value of the luminance of light emitted is 100, the area indicated by A1 represents the range of 90 to 100 percent of luminance compared to the highest luminance. Similarly, the area indicated by A2 represents the range of 80 to 90 percent of luminance compared to the highest luminance, the area indicated by A3 represents the range of 70 to 80 percent of luminance compared to the highest luminance, the area indicated by A4 represents the range of 60 to 70 percent of luminance compared to the highest luminance, the area indicated by A5 represents the range of 50 to 60 percent of luminance compared to the highest luminance, the area indicated by A6 represents the range of 40 to 50 percent of luminance compared to the highest luminance, the area indicated by A7 represents the range of 30 to 40 percent of luminance compared to the highest luminance, and the area indicated by A8 represents the range of 20 to 30 percent of luminance compared to the highest luminance.

Figure 10:
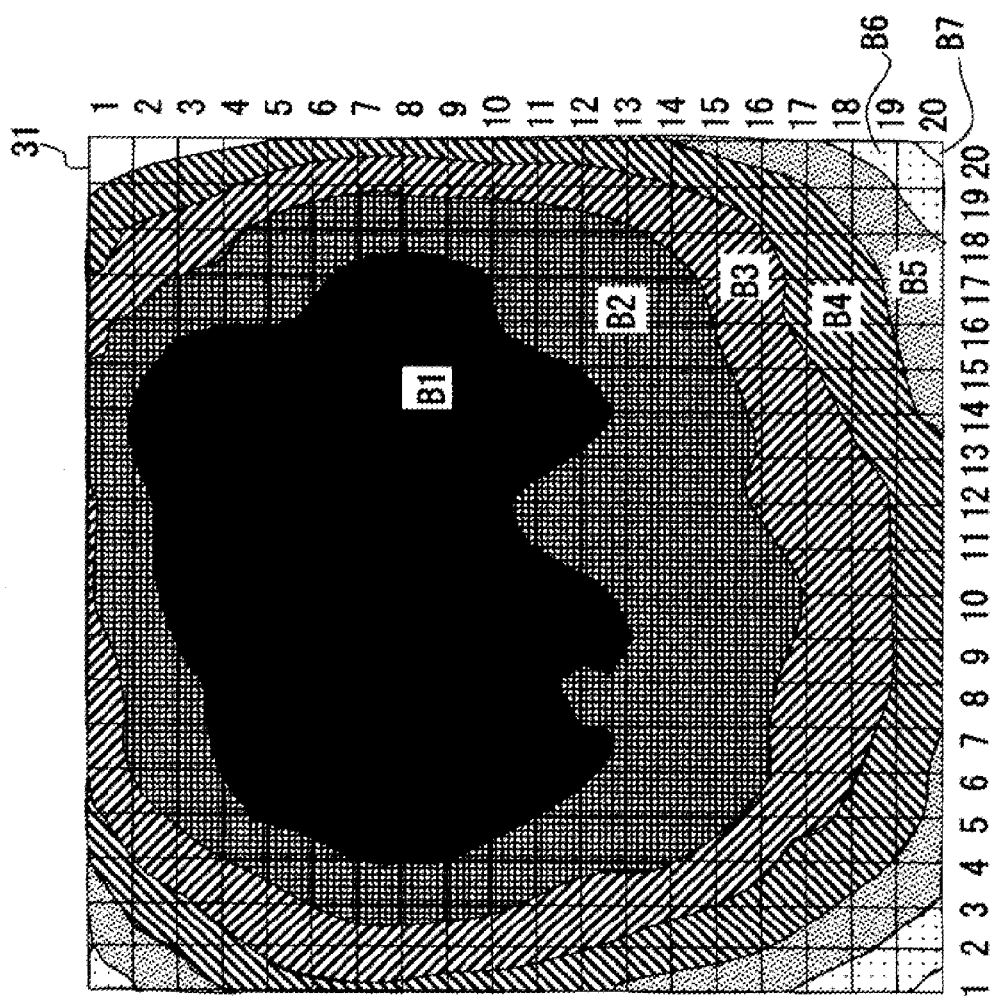
FIG. 10 shows a luminance distribution of light emitted from light emitting areas of twenty LED/light guide plate units.

FIG. 10 shows the luminance of light emitted from light emitting area 31 (see FIG. 2) formed by combining twenty LED/light guide plate units 2 where light emitting area 31 formed with twenty light emitting areas 8 are divided into a total of 400 areas of 20 areas in the X direction and 20 areas in the Y direction and the luminance of light emitted from the center of 400 divided areas is measured such that measurement results associated with the surface of light emitting area 31 are shown. In this FIG. 10, assuming that the highest numerical value of the luminance of light emitted is 100, the area indicated by B1 represents the range of 90 to 100 percent of luminance compared to the highest luminance. Similarly, the area indicated by B2 represents the range of 80 to 90 percent of luminance compared to the highest luminance, the area indicated by B3 represents the range of 70 to 80 percent of luminance compared to the highest luminance, the area indicated by B4 represents the range of 60 to 70 percent of luminance compared to the highest luminance, the area indicated by B5 represents the range of 50 to 60 percent of luminance compared to the highest luminance, the area indicated by B6 represents the range of 40 to 50 percent of luminance compared to the highest luminance, and the area indicated by B7 represents the range of 30 to 40 percent of luminance compared to the highest luminance. Further, the dimension of light emitting area 31 shown in FIG. 10 is reduced in the X direction for ease of comparison with light emitting area 31 of an individual light guide plate of FIG. 9.

In comparison of FIG. 9 with FIG. 10, light emitting area 31 of FIG. 10 combining twenty light emitting areas 8 does not produce the luminance distribution of twenty individual lights emitted as shown in FIG. 9. Instead, light emitting area 31 produces an luminance distribution of light emitted as if twenty light emitting areas 8 formed one light emitting area 31, and the luminance of light emitted is the highest in a predetermined range in the center part and gradually decreases from the center part to the periphery. Moreover, in this FIG. 10, dark lines are not produced in the boundary portions between light emitting areas 8 of light guide plates 4.

As described above, surface light source device 1 according to the present embodiment can improve the quality of illumination without producing dark lines between neighboring light guide plates 4 even when a plurality of LED/light guide plate units 2 are used in combination. Consequently, a lighting device equipped with surface light source device 1 according to the present embodiment enables quality illumination even when the light emitting surface is made larger. Further, an image display device equipped with surface light source device 1 according to the present embodiment enables quality image display by means of quality illumination even when the display screen is made larger.

Furthermore, with the present embodiment, the angle of a minimal degree is selected for the angle θ formed between surface 4a of light guide plate 4 attached on substrate 3 and upper surface 3a of substrate 3, such that part of other neighboring light guide plates 4 can be placed in gap 21 formed between light guide plate 4 and substrate 3 and a predetermined number of light guide plates 4 can be assembled on substrate 3. By this means, it is possible to make thinner the total thickness of surface light source device 1 (i.e. the dimension of height in the normal direction with respect to upper surface 3a of substrate 3), and make thinner a lighting device and image display device that use this surface light source device 1.

Further, with surface light source device 1 according to the present embodiment, a large number of small, thin light guide plates 4 are collected to form a large light emitting area, so that it is possible to readily make surface light source device 1 light compared to the case where a single, large and thick light guide plate is used. By this means, it is possible to make lighter a lighting device and image display device that use this surface light source device 1 according to the present embodiment.

Embodiment 2

Figure 11:
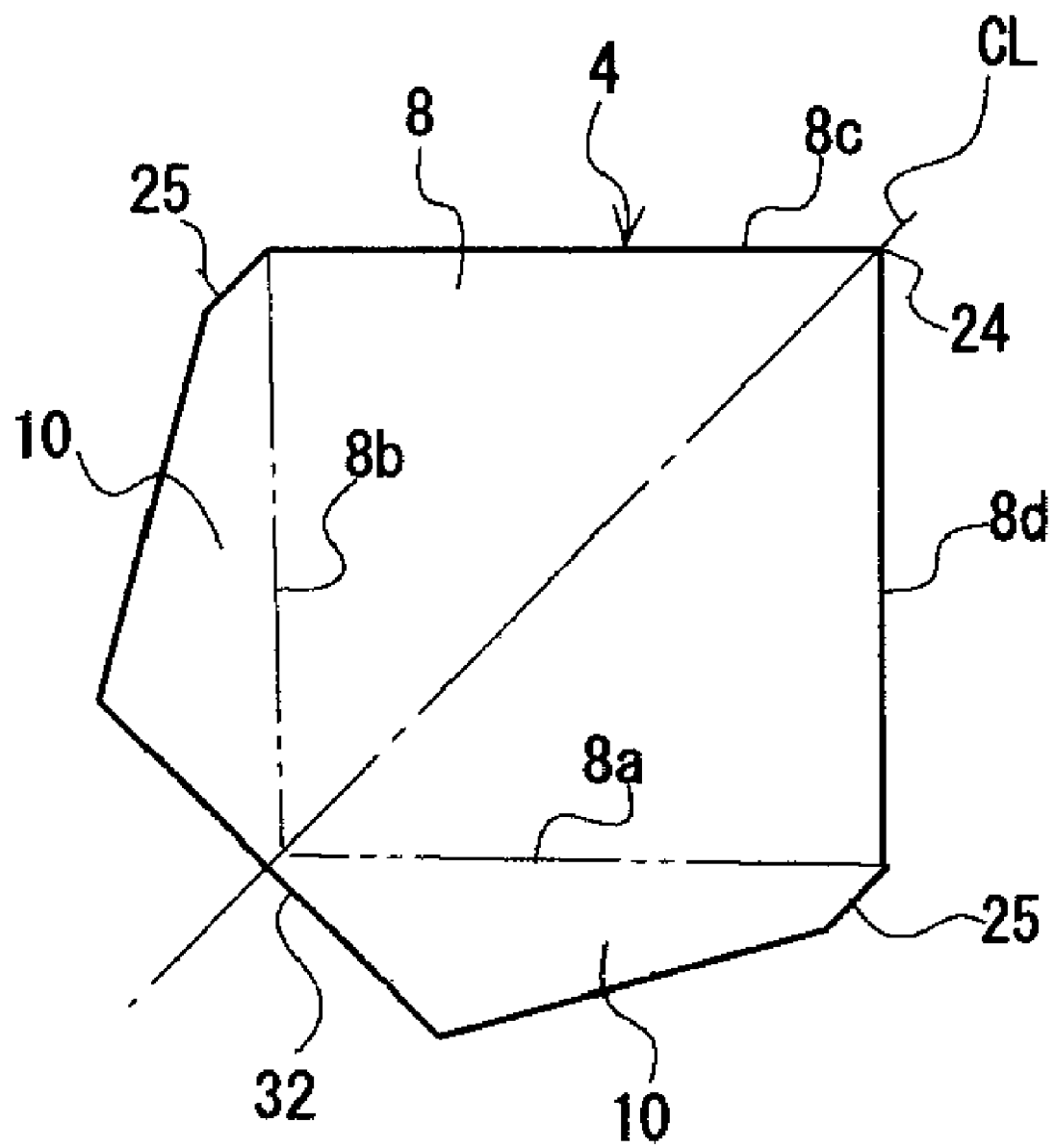
FIG. 11 is a plan view of a light guide plate of a surface light source device according to Embodiment 2 of the present invention.

FIG. 11 shows Embodiment 2 of light guide plate 4 used in surface light source device 1. As shown in this FIG. 11, light guide plate 4 has a shape in which the front end side of attaching flange parts 12 is cut off from light guide plate 4 shown in FIG. 4A. Further, the same portions of light guide plate 4 shown in this FIG. 11 as in light guide plate 4 shown in FIG. 4A will be assigned the same reference numerals, and overlapping explanation will be omitted.

In light guide plate 4 shown in this FIG. 11, end part lateral surface 32 formed by cutting off attaching flange parts 12 from light guide plate 4 of FIG. 4A forms an incidence surface area. Further, extended area 10 of light guide plate 4 shown in this FIG. 11 is fixed to the substrate (not shown) by an adhesive or double-sided tape. Note that light guide plate 4 may be fixed to substrate 3 by a fixing screw by forming a screw hole in a portion of extended area 10 where little light reaches from the LED.

Other Modified Example

Further, in case where light leaked from the lateral surface of light emitting area 8 of light guide plate 4 decreases the quality of illumination, it is possible to prevent a decrease in the quality of illumination due to leakage of light, by blocking light by applying a black paint to the lateral surfaces (lateral surfaces corresponding to sides 8c and 8d) of light guide plate 4 on the rear end 24 side and width direction end surfaces 25 of extended area 10.

Furthermore, in surface light source device 1 according to Embodiment 1 of the present invention, it is possible to adequately form a light diffusion pattern in light emitting area 8 of light guide plate 4 and change the characteristics of light emitted according to the design specifications and so on that are required.

Still further, although an embodiment has been illustrated in which surface light source device 1 according to Embodiment 1 of the present invention uses white LEDs for LEDs 6, the present invention is not limited to this, and LEDs of three colors of red (R), green (G) and blue (B) may be used instead of white LEDs.

Moreover, in case where an area for blending colors is required, it is possible to utilize the area between incidence surface area 11 of extended area 10 and light emitting area 8 as an area for blending colors, and adequately set the length of this area when necessary. In case where an area for blending colors is not required, it is possible to set the distance from incidence surface area 11 to light emitting area 8 short, as shown in FIG. 11.

Further, with surface light source device 1 according to Embodiment 1 of the present invention, apex 27 of a pair of inclining sides 28a and 28b of reflective sheet 5 is slightly shifted from rear end 24 of light guide plate 4 to suppress light emitted from lateral end parts of sides 8c and 8d of light emitting area 8 of light guide plate 4 on the rear end 27 side, so that more uniform surface illumination is possible.

Furthermore, although an embodiment has been illustrated in which surface light source device 1 according to Embodiment 1 of the present invention are formed by combining twenty LED/light guide plate units 2, the present invention is not limited to this, and, by combining a larger number of LED/light guide plate units 2, it is possible to form a larger light emitting area, and enable a wider range of illumination and larger image display.

Still further, reflective sheet 5 is not limited to the reflective sheet shown in FIG. 6 and a plurality of reflective sheets 5 matching a plurality of light guide plates 4 may be integrally formed.

Moreover, although surface light source device 1 according to Embodiment 1 of the present invention is configured such that the thicknesses of extended area 10 and light emitting area 8 of light guide plate 4 gradually decrease from the incidence surface area 11 side toward the rear end 24 side, the present invention is not limited to this, and it is equally possible to form extended area 10 and light emitting area 8 of light guide plate 4 to have a uniform thickness from the incidence surface area 11 side to the rear end 24 side and a light emission facilitating means (for example, fine irregular surface or prism surface) may be formed on the back surface side of light emitting area 8.

REFERENCE SIGNS LIST

1 SURFACE LIGHT SOURCE DEVICE
2 LED/LIGHT GUIDE PLATE UNIT (LIGHT EMITTING ELEMENT/LIGHT GUIDE PLATE UNIT)
4 SUBSTRATE
4b BACK SURFACE
5 REFLECTIVE SHEET
6 LED (LIGHT EMITTING ELEMENT)
8 LIGHT EMITTING AREA
10 EXTENDED AREA
13 DIAGONAL LINE
CL CENTER LINE (EXTENDING LINE OF DIAGONAL LINE)

The invention claimed is:

1. A surface light source device that combines a light emitting element and a light guide plate to form a light emitting element/light guide plate unit, and that combines a plurality of light emitting element/light guide plate units to emit planar light of a rectangular shape, wherein:

the light guide plate comprises:
- a light emitting area that has a square shape from a plan view and that comprises a surface of an emission surface and a back surface provided on an opposite side of the surface;
- an extended area that is positioned extending outward from a pair of neighboring sides in four sides defining an outer rim of the light emitting area; and
- an incidence surface area that allows light from the light emitting element to enter an end part lateral surface of the extended area;

the extended area and the incidence surface area have symmetrical shapes with respect to one of diagonal lines of the light emitting area and an extending line of the one diagonal line;

one of the plurality of light emitting element/light guide plate units is combined with another light emitting element/light guide plate unit by:
- assuming that the light guide plate of the one light emitting element/light guide plate unit is a first light guide plate and the light guide plate of the other light emitting element/light guide plate unit is a second light guide plate;
- making orientations of the first light guide plate and the second light guide plate uniform;
- aligning a side, which is one of the four sides defining an outer rim of the light emitting area of the second light guide plate and in which the extended area is formed, with a side which is one of the four sides defining an outer rim of the light emitting area of the first light guide plate and in which the extended area is not formed;
- placing the extended area of the second light guide plate in a back surface side of the light emitting area of the first light guide plate; and
- positioning the side in which the extended area of the first light guide plate is not formed, on the second light guide plate; and a reflective sheet is arranged on a substantially entire area of at least the back surface side of the light emitting area of the first light guide plate, and, in a position where the first light guide plate and the second light guide plate overlap, is arranged between a back surface side of the first light guide plate and a surface side of the second light guide plate.

2. The surface light device according to claim 1, wherein:
the light emitting element/light guide plate units are arranged in a matrix shape; and
in every position in the matrix shape, light guide plates of two neighboring light emitting element/light guide plate units are arranged such that a relationship of the position between the first light guide plate and the second light guide plate is satisfied.

3. A lighting device comprising:
the surface light source device according to claim 1; and
a light control member that controls a direction in which light emitted from the surface light source device propagates.

4. An image display device that comprises:
the lighting device according to claim 3; and
a member-to-be-illuminated that is backlighted by light of the lighting device.

* * * * *